United States Patent [19]

Langrehr

[11] Patent Number: 5,785,990
[45] Date of Patent: Jul. 28, 1998

[54] FEED FORTIFIER AND ENHANCER FOR PRERUMINANT CALVES AND METHOD OF USING SAME

[75] Inventor: Jana S. Langrehr, Bangor, Wis.

[73] Assignee: Merrick's, Inc., Middleton, Wis.

[21] Appl. No.: 500,221

[22] Filed: Jul. 10, 1995

[51] Int. Cl.$^6$ .......................... A23K 1/165; A23K 1/17; A01N 63/00
[52] U.S. Cl. .......................... 424/442; 424/600; 424/638; 424/643; 424/639; 424/682; 424/702; 424/722
[58] Field of Search .......................... 424/438, 442, 424/93.462, 93.44, 93.45, 638, 639, 643, 682, 600, 702, 722; 426/72, 73

[56] References Cited

U.S. PATENT DOCUMENTS

| | | | |
|---|---|---|---|
| 4,857,332 | 8/1989 | Schricker | 424/442 |
| 4,919,936 | 4/1990 | Iwanami et al. | 424/442 |
| 4,960,589 | 10/1990 | Sasagawa | 424/442 |
| 5,372,811 | 12/1994 | Yoder . | |
| 5,574,999 | 11/1996 | Yoder . | |

*Primary Examiner*—Thurman K. Page
*Assistant Examiner*—Sharon Howard
*Attorney, Agent, or Firm*—Reinhart, Boerner, Van Deuren, Norris & Rieselbach, S.C.

[57] ABSTRACT

A feed fortifier and enhancer for preruminant, bovine calves comprising animal plasma as well as other ingredients. The feed fortifier and enhancer may be mixed with any liquid feed to be fed to preruminant calves.

7 Claims, No Drawings

FEED FORTIFIER AND ENHANCER FOR PRERUMINANT CALVES AND METHOD OF USING SAME

FIELD OF INVENTION

This invention relates to a feed fortifier and enhancer for preruminant liquid feedstuffs, and in particular, to a feed fortifier and enhancer comprising animal plasma, vitamins, minerals, electrolytes, allicin, direct fed microbials, fructooligosaccharides and a protein ingredient.

BACKGROUND OF THE INVENTION

One of the most important phases of dairy production is that of feeding and managing dairy calves. Current mortality statistics reveal approximately 20–25% of dairy calves die before reaching maturity. These deaths may be caused by improper nutrition, or more frequently, by infections due to pathogenic microbial species. However, by supplying the calves with the proper mutualistic microbes, limited spectrum antimicrobial compounds which act against pathogens, as well as the proper supplements and nutritional additives, these losses may be greatly reduced.

Physiologically, the newborn calf is not a functioning ruminant. The calf is a true functional ruminant approximately twelve weeks after birth. The preruminant stage is a difficult time in the health of the calf because neither the rumen nor the intestinal tract have been fully and effectively colonized by the mutualistic microorganisms required by the calf to maintain proper health.

The rumen of bovine species is colonized by microorganisms which serve several purposes. The mutualistic microbes within the rumen allow the animal to breakdown feedstuffs into their component parts, which are used to synthesize microbial protein, which provides the ruminant with a portion of its protein requirement. The microbes within the rumen also synthesize and supply many of the nutrients, including most of the water soluble vitamins, required by the animal. Since preruminant calves are not true functional ruminants, these calves require a high quality, well balanced liquid feed containing all of the nutrients necessary to maximize growth and maintain health.

Additionally, the intestinal tract of the newborn calf is sterile. The sterile intestinal tract is then colonized by successive waves of microorganisms. Some of the microorganisms which colonize the intestinal tract during the early waves of colonization may be detrimental to the health of the calf. It is therefore important to take steps to inhibit the growth of any pathogenic microorganisms within the preruminant calf's intestinal tract, as well as stimulate the growth of beneficial bacteria therein.

Colostrum is a main source of feed for preruminant calves, particularly the first few days after birth. Colostrum is the milk which is high in immunoglobulins, and which is secreted by cows, and other mammalian females, for the first few days following parturition, and is a main nutritional source for neonatal calves.

Colostrum is used as a preruminant calf feed for a number of reasons. First, because bovine species do not undergo placental transfer of immunoglobulins, neonatal calves have no antibodies to provide them natural protection against disease. The immunoglobulins present within the colostrum provide a level of passive immunity for the calves. Second, the calves' immunity immediately following birth is virtually nonexistent and their intestinal surfaces basically sterile, thereby providing a high likelihood that the calves may become infected with highly pathogenic bacteria immediately after birth. Colostrum is used to provide protection against colonization of the calf by pathogenic organisms.

Colostrum is one type of liquid feed known in the art used in an attempt to supply the proper nutrition and immunoprotection to preruminant calves. However, the use of colostrum as a primary feed for preruminant calves has several problems associated with it. First, the quality of the colostrum, which is based on amount of immunoglobulins contained therein, varies between individual cows and also declines over time. The level of immune protection afforded a calf from the first milking colostrum obtained from the cow immediately postpartum is much greater than the level of immune protection supplied by colostrum obtained from subsequent milkings. Further, the levels of vitamins, minerals and other nutrients required by the calf found in the colostrum vary from milking to milking and cow to cow. Additionally, a cow may be "dry", e.g. not give milk, or may die immediately following birth of the calf, resulting in insufficient colostrum availability.

Another source of nutrition known in the art for a preruminant calf is milk that cannot be sold but is used as calf feed. Such milk is usually obtained from initial milkings following antibiotic treatment of a dairy cow for a number of syndromes, including uterine infections and mastitis, and is known as hospital milk, sick cow milk or pot milk (collectively referred to as "hospital milk"). Because this milk is unsalable, hospital milk is fed to calves rather than disposing of it. However, this milk varies in nutritional quality, is not a significant source of immunoglobulins, and additionally can be the source of pathogenic bacteria, especially if from mastitic cows. Further, hospital milk may contain antibiotic residues within the milk. "Unsalable milk" is defined as milk which can not, by law, be sold for human consumption. Unsalable milk includes both hospital milk and colostrum. Dairy producers frequently mix all unsalable milk together, including colostrum, to be used as calf feed, which dilutes any health benefits supplied by the colostrum to the preruminant calves.

Finally, whole milk or milk replacer are widely used as liquid feeds for preruminant calves.

However, feeding whole milk to calves is usually cost prohibitive. Whole milk may lack sufficient amounts of vitamins and minerals needed by preruminant calves being raised in stressful situations, which may include poor management and sickness. Further, whole milk does not contain significant levels of immunoglobulins to aid in protection against pathogens.

Non-medicated milk replacers (hereinafter "milk replacers") are formulated feeds designed to replace the dam's milk for calves during critical, early suckling or milk feeding stages of life. Milk replacers generally contain 20–24% protein, preferably derived from milk products (e.g., whey, whey protein concentrate or skim milk); 10–20% fat, preferably derived from animal fats although other fat sources may be used; carbohydrates, mainly from lactose; and essential vitamins and minerals. Milk replacers are reconstituted with water, mixed and fed according to the directions of the manufacturer. For dairy producers, it is generally more profitable to sell the whole milk and purchase a high quality milk replacer to feed the young calves. However, some milk replacers may vary in quality from other milk replacers and may have lower levels of vitamins and minerals than others. For example, some low quality milk replacers may lack a sufficient amount of vitamin E, which is important to promote immunoglobulin production in young calves. Moreover, milk replacers are unlikely to provide any protection to the calf against harmful microorganisms.

Liquid feed sources for preruminant calves known in the art such as hospital milk or low quality milk replacer suffer from the problem of being unable to supply to the preruminant calves' proper nutritional diet that is consistent and of high quality, and generally do not provide proper protection against harmful microorganisms. Other liquid feed sources such as colostrum and whole milk may not provide sufficient vitamins, minerals and immunoprotection, especially in stressful times within the preruminant calf's life. The present invention provides a solution to these problems, allowing the user to maintain health, maximize growth, and minimize mortality in preruminant calves.

SUMMARY OF THE INVENTION

It is an object of the present invention to provide a novel liquid feed fortifier and enhancer which will overcome the disadvantages associated with liquid preruminant calf feed known in the art. Briefly stated, the invention is a fortifier and enhancer for liquid feed comprising animal plasma, as an improvement, together with other ingredients such as vitamins, minerals, electrolytes, allicin, fructooligosaccharides, direct fed microbials, and one or more proteins that are readily digestible by a preruminant calf.

Accordingly, in one aspect the invention consists of a liquid feed fortifier and enhancer for preruminant calves which enhances the quality of the liquid feed fed to calves by providing a consistent level of nutrition to the calves, by supplying essential vitamins, minerals and electrolytes, as well as substances to protect against microbial pathogens comprising:

(a) about 50–75% by weight protein ingredient;

(b) about 10–50% by weight animal plasma;

(c) about 2.5–10% by weight micronutrients, selected from the group consisting of cobalt, copper, iodine, iron, magnesium, manganese, selenium, zinc, choline chloride, vitamin C, niacin, d-pantothenic acid, riboflavin, thiamine, menadione dimethylpyrimidinol bisulfite, pyridoxine, folic acid, vitamin E, vitamin A, vitamin $D_3$, vitamin $B_{12}$, biotin, biocompatible salts thereof and mixtures thereof;

(d) electrolytes, at less than about 2.5% by weight, selected from the group consisting of salts of sodium, magnesium, potassium, calcium, and combinations thereof, with the electrolytes being in a biocompatible form;

(e) about 0.8–3.4% by weight of a vitamin E ingredient, when the vitamin E concentration in the vitamin E ingredient is approximately 60,000 IU/lb of the ingredient;

(f) about 0.3–1.4% by weight a vitamin A ingredient, when the vitamin A concentration in the vitamin A ingredient is approximately 7,562,000 IU/lb of the ingredient;

(g) about 0.1–0.4% by weight of a vitamin $D_3$ ingredient, when the vitamin $D_3$ concentration in the vitamin $D_3$ ingredient is approximately 15,000,000 IU/lb of the ingredient;

(h) allicin, at less than about 2.0% by weight;

(i) fructooligosaccharides, at less than about 2.0% by weight; and (j) direct fed microbials, at less than about 1.0% by weight, which are selected from the group consisting of Bacillus coagulans, Bacillus licheniformis, Bacillus subtilis, Bifidobacterium bifidum, Lactobacillus acidophilus, Lactobacillus casei, Lactobacillus lactis, Streptococcus diacetylactis, and mixtures thereof.

It is a further object of the present invention to provide a liquid feed fortifier and enhancer for preruminant calves which will supply a consistent and high quality nutritional feed for the calves as well as supplying the calf with direct fed microbials and anti-microbial agents, to protect the calf from pathogenic microbes and promote the growth of mutualistic bacteria within the calves.

It is a further object of the invention to provide a nutritional liquid feed fortifier and enhancer for preruminant calves that may be prepared quickly and economically, comprising about 64–65% by weight dried whey; about 25–26% by weight animal plasma; about 5–6% by weight Merrick's Herd Replacer Premix #366; about 2–3% by weight Merrick's Blue Ribbon Calf Electrolyte Pack; about 1–2% by weight of a vitamin E ingredient, when the vitamin E concentration in the vitamin E ingredient is approximately 60,000 IU/lb of the ingredient; a vitamin A ingredient at less than about 1% by weight, when the vitamin A concentration in the vitamin A ingredient is approximately 7,562,000 IU/lb of the ingredient; a vitamin $D_3$ ingredient at less than about 0.5% by weight, when the vitamin $D_3$ concentration in the vitamin $D_3$ ingredient is approximately 15,000,000 IU/lb of the ingredient; and Enteroguard™, at less than about 1% by weight.

It is also an object of the present invention to provide a feed fortifier and enhancer for a liquid feed for a preruminant calf comprising about 50–75% by weight dried whey; about 10–50% by weight animal plasma; about 2.5–10% by weight Merrick's Herd Replacer Premix #366; about 1–5% by weight Merrick's Blue Ribbon Calf Electrolyte Pack; about 0.8–3.4% by weight vitamin E ingredient, when the vitamin E concentration in the vitamin E ingredient is approximately 60,000 IU/lb of the ingredient; about 0.3–1.4% by weight of a vitamin A ingredient, when the vitamin A concentration in the vitamin A ingredient is approximately 7,562,000 IU/lb of the ingredient; about 0.1–0.4% by weight of a vitamin $D_3$ ingredient, when the vitamin $D_3$ concentration in the vitamin $D_3$ ingredient is approximately 15,000,000 IU/lb of the ingredient; and about 0.03–1.9% by weight Enteroguard™.

It is still another object of the invention to supplement the nutrition of and provide added protection against microbial pathogens to preruminant calves by dissolving about one ounce of the liquid feed fortifier and enhancer of the present invention in about two quarts of whole milk, reconstituted milk replacer, unsalable milk or other liquid feed, and feeding the resulting mixture to preruminant calves as required, typically between 1 and 4 times, and preferably twice, per day.

DETAILED DESCRIPTION OF THE INVENTION

The present invention comprises a nutritional liquid feed fortifier and enhancer (hereinafter "feed fortifier") for preruminant calves which has as an improvement the presence of animal plasma and has several beneficial features. In the present invention, a broad spectrum of ingredients are combined to create a novel feed fortifier which is economical and easy to use for feeding preruminant calves and will enhance and improve the nutritional diet of the calves while further helping to protect the calves from pathogenic microorganisms and other harmful diseases.

The feed fortifier of the present invention may be used as a primary source of vitamins, minerals, electrolytes and immunoprotection, or may be added to other liquid feeds to boost such levels that exist within the feed. This additional boost of nutrition and immunoprotection may be highly desirable as a preventative measure, or as added protection in times of stress in the life of the preruminant calf.

The feed fortifier of the present invention comprises about 50–75% by weight protein ingredient; about 10–50% by weight animal plasma; about 2.5–10% by weight micronutrients, selected from the group consisting of cobalt, copper, iodine, iron, magnesium, manganese, selenium, zinc, choline chloride, vitamin C, niacin, d-pantothenic acid, riboflavin, thiamine, menadione dimethylpyrimidinol bisulfite, pyridoxine, folic acid, vitamin E, vitamin A, vitamin $D_3$, vitamin $B_{12}$, biotin, biocompatible salts thereof and mixtures thereof; electrolytes, at less than about 2.5% by weight, selected from the group consisting of salts of sodium, magnesium, potassium, calcium, and combinations thereof, with the electrolytes being in a biocompatible form; about 0.8–3.4% by weight vitamin E ingredient, when the vitamin E concentration in the vitamin E ingredient is approximately 60,000 IU/lb of the ingredient; about 0.3–1.4% by weight of a vitamin A ingredient, when the vitamin A concentration in the vitamin A ingredient is approximately 7,562,000 IU/lb of the ingredient; about 0.1–0.4% by weight of a vitamin $D_3$ ingredient, when the vitamin $D_3$ concentration in the vitamin $D_3$ ingredient is approximately 15,000,000 IU/lb of the ingredient; allicin, at less than about 2.0% by weight; fructooligosaccharides, at less than about 2.0% by weight fructooligosaccharides; and direct fed microbials, at less than about 1.0% by weight, selected from the group consisting of Bacillus coagulans, Bacillus licheniformis, Bacillus subtilis, Bifidobacterium bifidum, Lactobacillus acidophilus, Lactobacillus casei, Lactobacillus lactis, Streptococcus diacetylactis, and mixtures thereof.

The inventor has surprisingly and unexpectedly observed that the addition of animal plasma to a feed fortifier for preruminant calves results in measurable health benefits to the calves. Particularly, it has been noted that the addition of animal plasma to the feed fortifier of the present invention results in a reduced incidence and severity of scours, a common digestive ailment in preruminant calves, when fed to preruminant calves. By feeding preruminant calves a liquid feed that is rich in animal plasma, it was discovered that generally the overall health of the preruminant calves improved, resulting in lower medical costs for calf producers. While not intending that the scope of the invention be limited by the hypothesis, the inventor believes that the animal plasma may stimulate the immune system of the calf. Further, the inventor has discovered that the addition of animal plasma to the diet of preruminant calves also stimulates the intake of dry feed, resulting in faster weight gain and earlier weaning from liquid feed. It was also discovered that preruminant calves raised under stressful conditions, e.g. poor management, poor sanitation, presence of pathogenic bacteria, ingestion of hospital milk, etc., also perform better to a diet that includes animal plasma.

Commercially available animal plasma (Merrick's, Inc., Middleton, Wis.) is present in the feed fortifier of the present invention in amounts ranging from about 10–50% by weight, and preferably contains about 25–26% by weight. The plasma may be derived from a variety of animal sources, the preferred sources being bovine or porcine plasma or a combination of both.

In order to provide a consistent, well-balanced liquid feed for preruminant calves that is able to effectively prevent syndromes and diseases associated with poor nutrition, various micronutrients, herein defined as "vitamins and minerals," are included in the feed fortifier of the present invention.

Vitamins serve many important purposes in the nutrition of healthy preruminant calves, and the addition of vitamin supplements to liquid neonatal calf feed serves to prevent symptoms of vitamin deficiency as well as a host of other syndromes. To promote and maintain the health of preruminant calves, small amounts of the water soluble vitamins, including thiamine (vitamin $B_1$), riboflavin (vitamin $B_2$), d-pantothenic acid, pyridoxine (vitamin $B_6$), vitamin $B_{12}$, biotin, choline, niacin, vitamin C, folic acid alone or in combination, are included in the feed fortifier of the present invention.

Bovine species with a functional rumen are able to synthesize all water soluble vitamins naturally. The resident microflora within the rumen produce and/or make available the vitamins needed for proper nutrition and health. In preruminant calves, however, the rumen has not become fully functional, and deficiencies of these required nutrients may result. Deficiency symptoms have been demonstrated for these vitamins, and in extreme cases, can lead to mortality which is costly to the calf producer.

The absence of water soluble vitamins from preruminant calves' diet has been associated with a number of health problems in the calves. These include paralysis of the hind quarters, characterized by a biotin deficiency; extreme weakness and labor breathing and the inability to stand, produced by a choline deficiency; loss of appetite, diarrhea, weakness and convulsions have been attributed to d-pantothenic acid deficiencies; and hyperemia of the mucous membrane of the mouth, lesions in the corner of the mouth and along the lips, loss of hair and excess salivation are attributable to a riboflavin deficiency. Further, a thiamine deficiency in calves may cause polio encephalomalacia, which is characterized by listlessness, muscular incoordination, progressive blindness, convulsions and sudden death; a vitamin $B_6$ deficiency can result in a loss of appetite, cessation of growth and after about three months, epileptic fits in some but not all calves; a vitamin $B_{12}$ deficiency can result in muscular weakness and general poor condition; a niacin deficiency can result in weight loss, diarrhea and/or dermatitis; and folic acid deficiency can produce megaloblastic anemia or leucopenia.

By feeding preruminant calves appropriate amounts of these water soluble vitamins, ill health effects from lack of these vitamins can be prevented until the calves are able to produce these vitamins in their functional rumens. The amount of each of these vitamins administered to preruminant calves must be sufficient to prevent harmful syndromes and diseases brought about by lack of these vitamins. Moreover, excessive amounts of these vitamins in the feed fortifier should be avoided so as to prevent unnecessary cost and possible vitamin toxicity to the animal. The minimum and maximum concentration of each of these vitamins contained in the feed fortifier of the invention is given in Table 1.

TABLE 1

Water Soluble Vitamins Contained in Feed Fortifier

| VITAMIN | Minimum Concentration* | Maximum Concentration* |
|---|---|---|
| choline chloride | 143.75 | 575.00 |
| vitamin C | 62.50 | 250.00 |
| niacin | 50.00 | 200.00 |
| d-pantothenic acid | 25.00 | 100.00 |
| riboflavin | 10.00 | 40.00 |
| thiamine | 6.25 | 25.00 |
| pyridoxine | 2.50 | 10.00 |
| folic acid | 0.31 | 1.25 |
| vitamin $B_{12}$ | 0.02 | 0.10 |
| biotin | 0.02 | 0.10 |

*milligrams per pound (mg/lb).

Bovine species, including preruminant calves, require supplementation of fat soluble vitamins A, $D_3$, E and K. Although vitamin $D_3$ may be synthesized in the skin of the calf by the action of ultraviolet radiation, young calves that are kept indoors, especially in wintertime, may suffer from a vitamin $D_3$ deficiency. Therefore, it is important to add vitamin $D_3$ to a balanced feed fortifier for preruminant calves. Rumen microbes usually synthesize adequate amounts of vitamin K to meet the needs of mature bovine.

However, young preruminant calves, whose rumen is not fully functional, should be supplemented with vitamin K.

Vitamin A deficiency can result in lacrimation, night blindness, slow growth, diarrhea, convulsive seizures, improper bone growth, blindness and susceptibility to respiratory and other infections. In order to prevent these vitamin A deficiency symptoms in preruminant calves, sufficient amounts of vitamin A are included in the feed fortifier of the present invention.

For calves that are raised indoors, supplementation of vitamin $D_3$ is especially important. Vitamin $D_3$ deficiency in young calves can result in rickets, the symptoms of which are: decreased appetite, lowered growth rate, digestive disturbances, stiffness in gait, labored breathing, irritability, weakness and occasionally convulsions. However, by supplying the feed fortifier of the present invention which contains sufficient amounts of vitamin $D_3$, problems associated with this vitamin deficiency will be avoided.

Vitamin E is an important nutrient for preruminant calves. Muscular dystrophy (commonly called "white muscle disease") is characterized by heart failure and paralysis varying in severity from slight lameness to inability to stand; this disease can occur in preruminant calves not receiving adequate levels of vitamin E.

Vitamin E has also been found to stimulate the immune response in bovine species. A high level of vitamin E will enhance immune function in calves and thereby provide better resistance to disease.

By supplying the preruminant calf with appropriate amounts of vitamin E in the feed fortifier of the invention, ill health effects due to deficiency syndromes will be avoided and the overall health of the animal will be improved.

Vitamin K is synthesized in large amounts in the rumen of bovine species. Preruminant calves, however, lack sufficient rumen colonization by mutualistic microbes to produce needed amounts of vitamin K. Therefore, by supplying vitamin K in the feed fortifier of the present invention, appropriate amounts of the vitamin will be supplied to the calf prior to its developing an active level of beneficial rumen microbes.

The amount of each of these vitamins provided by the feed fortifier of the present invention must be at a sufficient level to prevent the diseases and symptoms associated with deficiencies of the fat soluble vitamins. Further, excessive amounts of these vitamins in the feed fortifier should be avoided so as to prevent unnecessary cost and possible vitamin toxicity to the animal. The minimum and maximum concentration of each of these vitamins contained in the feed fortifier of the invention is given in Table 2.

TABLE 2

Fat-Soluble Vitamin Content of Feed Fortifier

| VITAMIN | Minimum Concentration* | Maximum Concentration* |
|---|---|---|
| vitamin A | 200,700 | 801,400 |
| vitamin $D_3$ | 51,000 | 201,000 |
| vitamin E | 600 | 2400 |
| menadione dimethylpyrimidinol bisulfite (vitamin K) | 5^ | 20^ |

*international units per pound (IU/lb feed fortifier), unless otherwise noted.
^milligrams per pound (mg/lb feed fortifier).

Preruminant calves are susceptible to a host of syndromes caused by mineral deficiencies. Some of these essential minerals include cobalt, copper, iodine, iron, manganese, magnesium, selenium, and zinc. A deficiency of cobalt may result in loss of appetite and severe anemia in calves. A lack of copper in the diet of young calves may result in straight pasterns causing the calves to stand forward on their toes. A lack of iodine in the diet of preruminant calves may result in hairlessness or, more importantly, goiter. Deficiency of iron may result in anemia, listlessness, pale mucous membrane, and reduced appetite and weight gain. A manganese deficiency can result in reduced growth rate, defective blood clotting and/or skeletal deformities in the calves. A magnesium deficiency in preruminant calves may result in either defective bones and teeth or tetany within the calves. Therefore, it is essential to supply proper amounts of magnesium to preruminant calves. Further, a lack of selenium in the diet of preruminant calves can result in white muscle disease, whereas a calf having a zinc deficient diet may suffer from stiffness of joints, rough scaly skin, parakeratosis and retarded growth.

Therefore, the feed fortifier of the present invention provides sufficient levels of these essential minerals to preruminant calves in order to prevent symptoms associated with deficiencies of these minerals. A sufficient amount of each mineral must be present in the feed fortifier in order to be effective in preventing these symptoms; excessive amounts of these minerals should be avoided so as to prevent unnecessary cost and possible toxicity. The minimum and maximum concentration of each of these minerals contained in the feed fortifier is listed in Table 3.

TABLE 3

Mineral Content Contained in Feed Fortifier

| MINERAL | Minimum Amount* | Maximum Amount* |
|---|---|---|
| iron | 437.5 | 1750.0 |
| zinc | 437.5 | 1750.0 |
| manganese | 225.0 | 900.0 |
| copper | 32.5 | 130.0 |
| magnesium | 25.0 | 100.0 |
| iodine | 5.0 | 20.0 |
| selenium | 1.5 | 6.0 |
| cobalt | 0.5 | 2.0 |

*parts per million (ppm).

The vitamins and minerals may be supplied on an individual basis to the feed fortifier or some or all of the vitamins and minerals may be supplied by the use of a premix.

Premixes are concentrated blends of micronutrients and/or specialty ingredients that are added to feeds and supplements. Use of commercial premixes may allow the user to save time and effort in preparing the feed fortifier of the present invention. Premixes are generally commercially prepared and consist of vitamins, minerals, and perhaps other additives, along with a carrier, formulated for blending with a larger mix. Rather than purchasing individual micronutrients and subsequently mixing the feed fortifier from these individual ingredients, it is possible to use a commercial premix to supply some or all of the micronutrients. The preferred premix which may be used to supply most or all of the micronutrients in the present invention is Merrick's Herd Replacer Premix #366 (Merrick's, Inc., Middleton, Wis.).

The feed fortifier of the present invention also contains various electrolytes available in a biocompatible and biodegradable form. Electrolytes are essential for the preruminant calves in order to maintain a variety of vital body functions. Some electrolytes may also function as essential minerals for preruminant calves. Essential electrolytes which help maintain proper function in the preruminant calves include salts of sodium, magnesium, potassium, calcium, and combinations thereof in a biocompatible, biologically active form. The preferred salts include sodium bicarbonate, sodium chloride, magnesium sulfate, potassium chloride, and calcium lactate. Optionally, additional electrolytes, including chloride and bicarbonate salts, may be added to the feed fortifier. All electrolytes may be supplied individually or through the use of an electrolyte premix. The preferred electrolyte premix used in the present invention is Merrick's Blue Ribbon Calf Electrolyte Pack (Merrick's, Inc., Middleton, Wis.). The minimum and maximum amounts of these electrolytes contained within the feed fortifier are listed in Table 4.

TABLE 4

Electrolyte Content of Feed Fortifier

| ELECTROLYTE | Minimum Concentration* | Maximum Concentration* |
| --- | --- | --- |
| sodium | 560 | 2800 |
| magnesium | 50 | 250 |
| potassium | 30 | 150 |
| calcium | 20 | 100 |

*parts per million (ppm).

The feed fortifier of the present invention also includes thio-2-propene-1-sulfinic acid S-allyl ester (allicin). Allicin is a naturally occurring antimicrobial material found in garlic (*Allium sativum*). Allicin has been shown to have extensive activity in preventing the growth of many bacteria, viruses and even protozoa, such as coccidia and cryptosporidia. However, a unique characteristic of allicin is that it has no inhibitory effects on the beneficial lactic acid bacteria found in the intestinal tract of the preruminant calf, leaving the beneficial lactic acid bacteria free to proliferate and colonize the intestinal tract of the calf, while inhibiting the growth of pathogenic microbes. Allicin is present in the feed fortifier of the present invention, but in amounts of less than about 2% by weight. Allicin may be added to the feed fortifier by direct addition to the product, or by adding extract of garlic containing allicin to the product. Further, the allicin may be added to the feed fortifier by using a commercial preparation containing allicin. In the preferred embodiment of the present invention, the allicin is contained in a commercial preparation which is added to the feed fortifier; the preferred commercial preparation is Enteroguard™ (Pharmax Biologicals, Minnetonka, Minn.).

The present invention further contains direct fed microbials included in order to help prevent colonization of the calf's intestinal tract by pathogenic microorganisms. The term "direct fed microbials" is herein defined as viable, mutualistic bacteria.

At birth, the calf's intestinal tract is essentially sterile. The skin of the calf is colonized by the microbes upon passing through the birth canal of the mother, and inoculation of the calf's intestinal tract follows by bacteria entering through the mouth of the calf. The first organism to become established in the gut of the preruminant calf is *E. coli*, followed by various species of *Streptococci*, and *Clostridium perfringens* and then by various *Lactobacilli*. Within 5–6 hours after birth, *E. coli* are restricted to the ileum, but within 8 hours after birth are found in the abomasum at levels of approximately 1,000 per milliliter. In normal healthy calves, *E. coli* counts will peak in 1–4 days and then subside as the *Lactobacilli* become predominant. These *Lactobacilli* help the preruminant calf in digestion. The period of time before *Lactobacilli* become the dominant species within the intestinal tract is a dangerous one for the neonatal calf. Colonization by pathogenic strains of *E. coli* may result in localized infections that can lead to the death of the calf.

In order to ensure that the lactic acid bacteria are present in sufficient numbers, and to further ensure colonization in the intestinal tract by mutualistic bacteria rather than pathogenic bacteria, direct fed microbials are added to the feed fortifier. These bacteria include *Bacillus coagulans, Bacillus licheniformis, Bacillus subtilis, Bifidobacterium bifidum, Lactobacillus acidophilus, Lactobacillus casei, Lactobacillus lactis, Streptococcus diacetylactis*, and mixtures thereof. The bacteria are present, but in amounts of less than about 1% by weight.

The direct fed microbials may be provided by adding viable bacteria or fermentation product containing the viable bacteria directly to the feed fortifier, or may be contained as ingredients in the various commercial preparations used in the feed fortifier.

The feed fortifier of the present invention further comprises fructooligosaccharides (FOS), present but at less than about 2% by weight. FOS are special types of sugar derivatives found in many naturally occurring products which may be used by beneficial bacterial such as *Bifidobacterium* species and *Lactobacillus acidophilus* as an energy source, while being much less available to pathogenic organisms such as *E. coli* and *Clostridium*. Adding FOS to the feed fortifier will help the beneficial bacteria become more dominant within the calf's intestinal tract. Other sugars, including glucose, may be added.

Further, amino acids and/or mineral supplements not previously listed may be added to the feed fortifier of the present invention to provide additional nutritional benefits to preruminant calves. These additional ingredients may be added separately or may be contained within one or more of the premixes or commercial preparations used to formulate the feed fortifier.

The balance of the feed fortifier comprises a high quality protein ingredient which is readily digestible by preruminant calves. This protein source acts as a carrier for the feed fortifier. Such protein sources may include, by way of example only, casein, skim milk, whey, and whey protein concentrate. The preferred protein ingredient in the present invention is whey.

In order to supply preruminant calves with the feed fortifier of the present invention, approximately one ounce of the feed fortifier is mixed with about two quarts of whole milk, unsalable milk, reconstituted milk replacer, or other suitable liquid feed. The liquid containing the feed fortifier is then fed to the calf by conventional means. Feed containing approximately one ounce of the feed fortifier should be fed to the preruminant calf as required, preferably twice per day, in order to supply the calf with a consistent and high quality nutritional diet and to effectively protect the calf against pathogenic microorganisms.

The feed fortifier of the present invention is prepared according to Example 1.

Example 1 - Preparation of Feed Fortifier

Liquid condensed whey (40% solids) and liquid animal plasma (18% solids) are preheated to 80° F. and pumped into a stainless steel tank. The liquid blend is simultaneously mixed and heated to 150° F. for 45 minutes for pasteurization. After pasteurization, the liquid blend is sifted through a 140 mesh screen into another heated holding tank. From this tank, it is pumped to a spray dryer. The inlet temperature is approximately 360° F. and the exhaust temperature is 150°

F. The liquid blend of whey and plasma is atomized through the nozzle orifices and the water is evaporated from the product. The dried powder drops to the dryer floor by gravity. The dried blend is then conveyed from the dryer to a cooler which reduces the temperature to approximately 80° F. The approximate cooling time is 8 minutes. Once cooling is completed the dried blend is sifted through a 14 mesh screen. The blended product is packaged for use in further manufacturing of the feed fortifier of the present invention.

The dried blend of whey and animal plasma is weighed and placed into a 1000 pound double ribbon stainless steel mixer. All additional feed fortifier ingredients are weighed and added to the mixer as follows: Merrick's Herd Replacer Premix #366 (Merrick's, Inc., Middleton, Wis.), Merrick's Blue Ribbon Calf Electrolyte Pack (Merrick's Inc., Middleton, Wis.), vitamin E (60,000 IU/pound), vitamin A (7,562,000 IU/pound), Enteroguard™ and vitamin $D_3$ (15,000,000 IU/pound). All dry ingredients comprising the feed fortifier are simultaneously blended together for 5 minutes. After blending is completed, the product is sifted through a 14 mesh screen prior to packaging.

Although the invention has been described with some specificity, those of skill in the art will recognize numerous variations and modifications of the specifics that are within the spirit of the invention. The variations and modifications are also within the scope of the invention as disclosed and claimed herein.

What is claimed is:

1. A feed fortifier and enhancer for a preruminant calf comprising:

about 50–75% by weight protein ingredient;

about 10–50% by weight animal plasma;

about 2.5–10% by weight micronutrients, selected from the group consisting of cobalt, copper, iodine, iron, magnesium, manganese, selenium, zinc, choline chloride, vitamin C, niacin, d-pantothenic acid, riboflavin, thiamine, menadione dimethylpyrimidinol bisulfite, pyridoxine, folic acid, vitamin E, vitamin A, vitamin $D_3$, vitamin $B_{12}$, biotin, biocompatible salts thereof and mixtures thereof;

electrolytes at less than about 2.5% by weight electrolytes selected from the group consisting of salts of sodium, magnesium, potassium, calcium and combinations thereof, with the electrolytes being in a biocompatible form;

about 0.8–3.4% by weight of a vitamin E ingredient, when the vitamin E concentration in the vitamin E ingredient is approximately 60,000 IU/lb of the ingredient;

about 0.3–1.4% by weight a vitamin A ingredient, when the vitamin A concentration in the vitamin A ingredient is approximately 7,562,000 IU/lb of the ingredient;

about 0.1–0.4% by weight of a vitamin $D_3$ ingredient, when the vitamin $D_3$ concentration in the vitamin $D_3$ ingredient is approximately 15,000,000 IU/lb of the ingredient;

allicin, at less than about 2.0% by weight;

fructooligosaccharides, at less than about 2.0% by weight; and direct fed microbials, at less than about 1.0% by weight, which are selected from the group consisting of *Bacillus coagulans, Bacillus licheniformis, Bacillus subtilis, Bifidobacterium bifidum, Lactobacillus acidophilus, Lactobacillus casei, Lactobacillus lactis, Streptococcus diacetylactis;* and mixtures thereof.

2. A method of supplying a feed fortifier and enhancer to a preruminant calf, comprising:

dissolving about one ounce of the feed fortifier and enhancer of claim 1 in about two quarts of liquid feed; and feeding the liquid feed containing the feed fortifier and enhancer to the preruminant calf.

3. The method of claim 2 wherein the liquid feed is selected from the group consisting of whole milk, unsalable milk, and reconstituted milk replacer.

4. A feed fortifier and enhancer composition for preruminant calves, comprising:

animal plasma;

viable mutualistic bacteria; and a proteinaceous carrier component for said plasma and said viable bacteria.

5. The composition of claim 4 wherein said animal plasma is present at about 10 to about 50% by weight.

6. The composition of claim 5 wherein said animal plasma is present at about 25 to about 26% by weight.

7. The composition of claim 4 further including fructooligosaccharides.

* * * * *